Oct. 20, 1925.
H. PHARES
DRAWING DEVICE
Filed Nov. 25, 1924    2 Sheets-Sheet 1
1,558,041
Fig. 1.
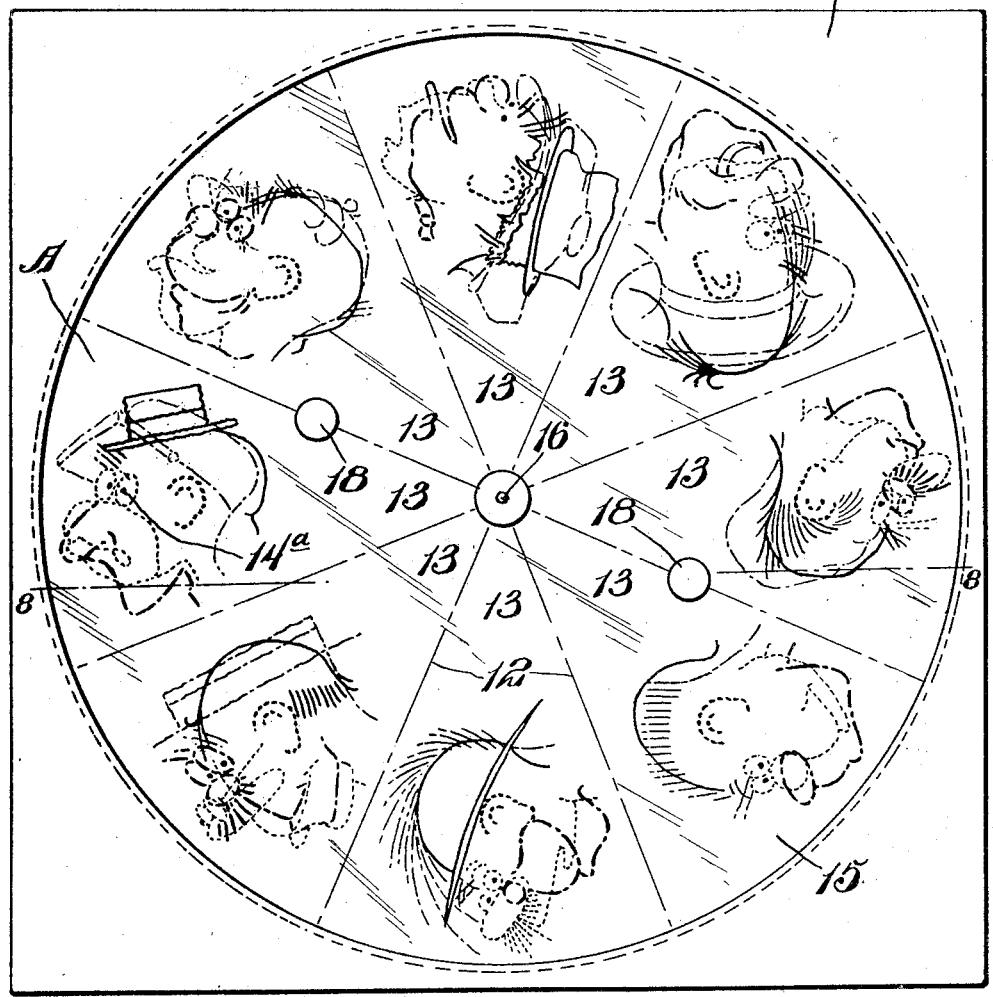
Fig. 2.
Fig. 8.
——— upper black
—·—· Lower black
········ upper red
—··—·· Lower red
········ Blue
Inventor
Harold Phares
Watson E. Coleman
Atty Oct. 20, 1925.

H. PHARES

DRAWING DEVICE

Filed Nov. 25, 1924

Inventor
Harold Phares
Watson E. Coleman
Atty

Patented Oct. 20, 1925.

1,558,041

UNITED STATES PATENT OFFICE.

HAROLD PHARES, OF ELIZABETH, NEW JERSEY.

DRAWING DEVICE.

Application filed November 25, 1924. Serial No. 752,201.

*To all whom it may concern:*

Be it known that I, HAROLD PHARES, a citizen of the United States, residing at Elizabeth, in the county of Union and State of New Jersey, have invented certain new and useful Improvements in Drawing Devices, of which the following is a specification, reference being had to the accompanying drawings.

This invention relates to devices for drawing pictures, and particularly to a device designed for use by children whereby figures may be traced.

One of the objects of the invention is to provide a device of this character so constructed as to permit various permutations and combinations to be made of a plurality of figures.

A further object is to provide a device of this character wherein there is a base sheet having thereon a series of figures preferably in outline, and a second sheet of transparent material adapted to be superposed upon the first sheet, with the figures on the second sheet in approximate registry with the figures on the first sheet so that a tracing may be made of the composite figure formed by the superposition of the second figure upon the first, this tracing being formed by selecting from the composite figure seen through the tracing sheet those lines which will give the best effect.

A still further object is to provide a device of this character wherein each figure on the first sheet is formed of lines of different colors and the figures on the second sheet are also formed of lines of different colors so that when one figure is superposed upon another those lines all of one color or all of certain colors only should be drawn to secure a proper selection of the proper lines from the two figures.

Another object is to provide a device of this character wherein there is a certain feature on each of the figures on the superposed sheet which, when brought into register with a like feature, insures that the two figures shall be in correct registration so as to permit a tracing to be made which shall be a composite of selected lines in the two figures.

A still further object is to provide a device of this character comprising a base sheet having thereon a series of figures in outline, preferably a series of heads, these heads being preferably caricatures and arranged in a series of spaces radial to a common center, the superposed sheet also having thereon a series of outline figures, preferably heads, the series being arranged in concentric relation to a center, the center of the superposed sheet being coincident with the center of the base sheet, and the superposed sheet being rotatable upon this center so as to bring any of the outline heads into superposed relation to the outline heads on the base sheet, the base sheet having its outlines in two colors, the superposed sheet having an outline in three colors and the composite drawing being adapted to be made by drawing all of certain colored lines of one head and all of certain other colored lines of the head beneath so that by tracing different colored lines on the two drawings two entirely different heads can be made.

Other objects will appear in the course of the following description.

My invention is illustrated in the accompanying drawings, wherein:—

Figure 1 is a face view of a drawing device constructed in accordance with my invention;

Figure 2 is a transverse sectional view through the drawing device;

Figure 8 is a cross section through Figure 1 on the line 8—8.

Figure 3:
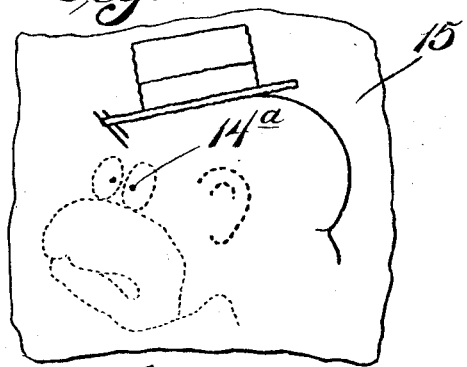
Figure 3 is a face view of a portion of the sheet 15 showing one of the heads thereon, this head being indicated by red, black and blue lines.
Figure 4:
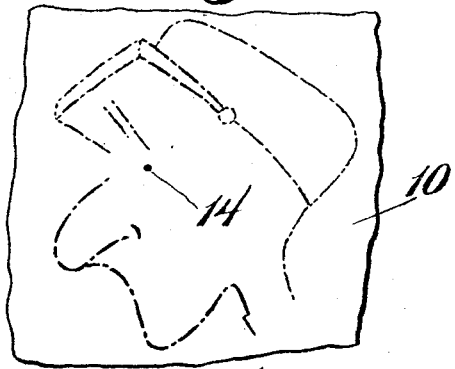
Figure 4 is a face view of the sheet 10 showing a head thereon indicated as being drawn of different colored lines.

Referring to these drawings, it will be seen that 10 indicates a base sheet, which I have illustrated as square, this base sheet having a center 11 with radiating lines 12 extending from the center and defining a plurality of radial spaces 13, and in these radial spaces are drawn, preferably in outline, a series of heads, preferably of an amusing or comical character. These outlines are drawn partially in red and partially in black or any other colors might be used or a combination of colors might be used. These outline heads, for instance, show certain features or characteristics in red lines, as before remarked, and certain other features or characteristics in black lines, and each head is provided with a dot 14 at the place indicating the eye.

Mounted upon the base sheet is a second or superposed sheet, designated 15, which sheet is circular in form and is mounted upon the superposed sheet by means of a pin or other center 16 which passes through the center 11 of the sheet below. This sheet 15, which is of translucent material as, for instance, tracing paper, may be rotated upon the subjacent sheet. Preferably, though not necessarily, this sheet 15 is also divided by radial lines into a series of spaces corresponding to the spaces 13 of the sheet below, and in each of these spaces there is disposed a figure as, for instance, a head more or less comically drawn. This head is formed with the eye 14ª. When the dot 14ª indicating the eye of the superposed figure is brought into coincidence with the dot 14 of the subjacent figure, the two figures are in registry with each other and a composite drawing may be made of certain selected lines of the two figures. The drawing on the sheet 15 is preferably made in three colors, black, red and blue, for instance, and as shown the upper portion of the head, that is the forehead, the back of the head and the nape of the neck, is made in black outline, while the lower portion including the nose and the jaw is made in red, the eye 14ª is preferably blue, and the ear is blue. The underneath figure has the upper portion of the head or the hat which surmounts it formed in red and the lower portion of the head as, for instance, the nose and jaws in black.

Thus it will be seen that when the superposed sheet 15 is turned into proper relation with the subjacent sheet by tracing the red lines of the upper sheet and the black lines of the upper sheet, one figure may be made and, on the other hand, by tracing the red lines of both sheets or tracing the black lines of both sheets or tracing the red lines of the subjacent sheet and the red lines of the sheet above that a complete head may be drawn. It is obvious that if these lines are of different colors, as indicated, it is rendered easy for a child to draw the proper lines selected from the two figures and that the complete figure so traced will be a composite of the selected lines of the two figures.

Assuming that the area of the two sheets is divided into eight spaces by the radial lines, it follows that the device will be capable of producing one hundred and twenty-eight combinations and that any one of the outlines on the upper sheet may be disposed in conjunction with any one of the outlines on the subjacent sheet. Thus from each of the eight sets can be drawn two different heads, one from tracing the red and blue lines, one from tracing the black and blue lines, making altogether sixteen heads from one register. Then by revolving the transparent disk one register point, sixteen more heads can be made and thus altogether there will be one hundred and twenty-eight separate and distinct heads which can be traced without missing or repeating any of the heads.

Preferably the base 10 will be made of relatively heavy cardboard and the sheet 15 of tracing paper, and there will be disposed upon the sheet 10 and overlapping the margin of the tracing paper a sheet 17 having its center cut out to form a circle. This sheet will be pasted down upon the sheet 10, leaving the margin loose so that the sheet 15 may be readily shifted. There will be some means whereby the superposed sheet 15 may be shifted around its center 16, and to this end I have shown buttons 18 mounted upon this superposed sheet, which buttons may be of any suitable material, and any other mean may be provided whereby this superposed sheet may be shifted.

While I have illustrated a series of outline drawings of heads on the two sheets and have illustrated these heads as caricatures, obviously I do not wish to be limited thereto as other figures might be used in place of heads, nor do I wish to be limited to the provision of sheets which are concentrically mounted with relation to each other, the upper sheet being rotatable around the center of the lower sheet, as it would be possible, though not as convenient, to have the heads arranged in strips and shift the strips over a base sheet having thereon the heads arranged in longitudinal series instead of radially. While I have found that the best results may be secured by making the outlines of the heads in red, black and blue, obviously other colors might be used, or the lines could be different as, for instance, dotted lines, dot and dash lines, or full lines.

In the actual use of this device, as before indicated, the lines are so arranged that when tracing all of the red and blue lines of one head and all the red lines of the head beneath it a complete head is made, or all of the black and blue lines of the superposed sheet may be traced and all of the black lines of the one beneath it may be traced to make a different and complete head.

Figure 5:
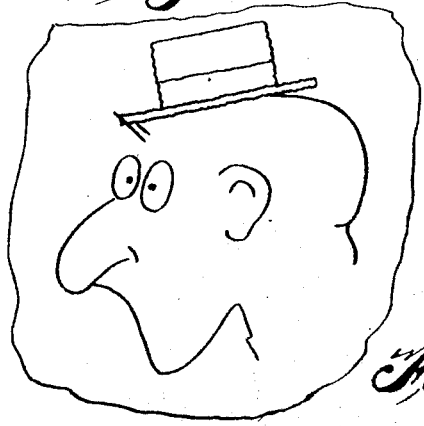
Figure 5 is a face view of a sheet of tracing paper having thereon a head which may be drawn by tracing through the sheet of tracing paper all of the black lines on the heads shown in Figures 3 and 4, the head shown in Figure 3 being superposed upon the head shown in Figure 4.
Figure 6:
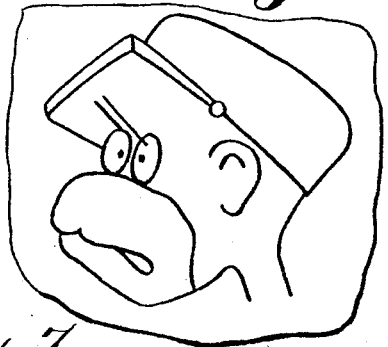
Figure 6 is a face view of a sheet of tracing paper showing a head which may be drawn thereon by tracing only the red lines of the heads shown in Figures 3 and 4.
Figure 7:
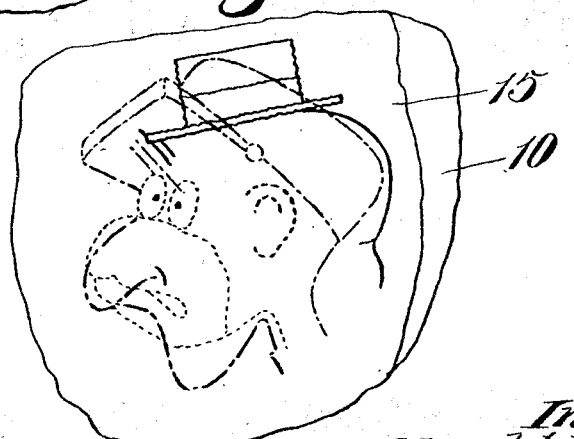
Figure 7 shows a view looking downward through the translucent sheet 15 showing the head illustrated in Figure 3 and the head illustrated in Figure 4 superposed with relation to each other, the tracing through the superposed heads securing the head shown in Figures 3, 4, 5 and 6.

Thus in Figures 3 to 7 I have illustrated the manner in which two of the heads on the space designated A in Figure 1 may be utilized so as to draw four separate and distinct heads. In Figure 7 I show the composite head formed by superposing the head shown in Figure 4 upon the head shown in Figure 3, the different colors being shown by dotted and solid lines of different characters. The head shown in Figure 3 may be made by tracing the red and black lines of the upper sheet 15, while the head shown in Figure 4 may be drawn by tracing the black and red lines of the head on sheet 10. The head shown in Figure 5 may be formed by tracing the black lines of the head shown in Figure 3 and of the head shown in Figure 4, while the head shown in Figure 6 may be formed by tracing the red lines of Figure 4 and the red lines of Figure 3. The ear shown in tracing Figures 5 and 6 is always upon the upper sheet and is indicated as being colored blue, there being no ear at all on the lower sheet, and in tracing the head shown in Figure 3, for instance, which is made up entirely of a tracing of the lines on the lower sheet, the ear is traced from the lines on the upper sheet. Some of the faces are in profile and certain other of the faces are in three-quarter view, but under all circumstances the eye of those figures which are in profile will register and the innermost eye where the head is in three-quarter view and shows two eyes will register.

While I have above indicated that outline figures may be made by accurately superposing one upon the other and bringing the eye into register, it is also possible to so construct the figures that they will not be in accurate registry and thus a very distorted caricature might be made by a little ingenuity. Obviously also it is possible to use a greater number of colors than merely black and red, leaving aside the blue which is only used for the ear in the figure, and thus a still greater number of combinations might be secured and I do not wish to be limited to the use of merely two sheets of paper, one of these sheets being translucent and operating over the other sheet, and then by combining the upper sheet with the lower sheet a still greater number of permutation and combinations can be used.

I claim:—

1. A drawing device comprising a base having thereon a series of outline figures, a transparent sheet superposed on the base and having thereon a series of figures in outline, the superposed sheet being adjustable to carry any of its figures into superposed approximately registering relation to any of the figures on the first sheet whereby a tracing may be made of the composite outlines.

2. A drawing device of the character described comprising a base having thereon a series of figures in outline, a transparent sheet superposed upon the base and having a like series of figures in outline, the second sheet being adapted to be superposed upon the first sheet with any one of its figures in approximate register with any other figures, the outlines of each figure being done in a plurality of colors whereby tracings may be made of selected colored lines in the figure.

3. A drawing device comprising a base having thereon a series of figures in outline, the outline being made in different colors, a transparent sheet superposed on the base and having a series of figures in outline, the lines of the figures being of different colors, half of each figure on one sheet being in lines of one color and half in lines of another color, and half of the figure on the superposed sheet being of one color and half of another, the upper half of the figure on one sheet being of a different color from the upper half of the figure on the other sheet, the figures on each sheet having a common registering point so that the figures on one sheet may be brought in approximate registery with the figures of the other sheet whereby a tracing may be made of certain lines of the two sheets to make a composite whole.

4. A drawing device comprising a base having thereon a series of figures in outline, these figures being arranged in concentric relation to a center, and a transparent sheet disposed on the base and having a series of figures in outline arranged in concentric series to their central point, the second sheet being rotatable around the central point of the first sheet whereby superposed figures may be brought in registry with the subjacent figures, the figures of the upper and lower sheets having common registration points.

5. A drawing device comprising a plurality of sheets disposed in superposed relation, each of these sheets having thereon a series of figures so arranged that any one of the figures of one sheet may be superposed upon the figures on the sheet below whereby the superposed figures may be brought in registry with the subjacent figures and tracings made of selected portions of the two figures.

6. A drawing device comprising a plurality of sheets, each having thereon a series of figures in outline, any one of the figures on one sheet being adapted to be disposed in approximate registry with any one of the figures on any of the other sheets whereby a tracing may be made showing a composite figure made up of selected lines of the several figures in registry with each other on the several sheets.

In testimony whereof I hereunto affix my signature.

HAROLD PHARES.